United States Patent Office 3,660,332
Patented May 2, 1972

3,660,332
PROCESS FOR PREPARING GRANULAR
GRAFT COPOLYMERS
Kosaku Kamio, Motoyuki Kuwana, Atsushi Takahashi, and Masao Sahara, Uozu, Japan, assignors to Nippon Carbide Kogyo Kabushiki Kaisha, Tokyo, Japan
No Drawing. Filed Sept. 4, 1970, Ser. No. 69,971
Claims priority, application Japan, Sept. 5, 1969, 44/75,015
Int. Cl. C08f 47/02
U.S. Cl. 260—23 XA
9 Claims

ABSTRACT OF THE DISCLOSURE

In a process for preparing a granular graft copolymer from a latex of graft copolymer produced by the emulsion graft polymerization of 70–5 parts of vinyl chloride onto 30–95 parts of an ethylene/vinyl ester copolymer through the salting-out, dehydrating and drying steps, the graft copolymer is heat treated at any step prior to the dehydrating step at a temperature of 60°–110° C. under the condition that the value (heating time)$^{1/2}$ × (heating temperature −30)$^2$ (min.$^{1/2}$. ° C.$^2$) falls within the range of 2,000 to 20,000 and the graft copolymer is dehydrated at a temperature lower than 60° C. but higher than 0° C. Thereby the graft copolymer can be dehydrated and dried much more conveniently than in the conventional processes, and the granular dry graft copolymer thus obtained causes far less odor of fatty acid during a long preservation or use compared to the conventional ones. Such improvements are promoted further by adding a Mg, Ca, Zn, Sr, Cd, Ba or Pb salt of a higher fatty acid to the graft copolymer at any step prior to the drying step.

---

This invention relates to a process for preparing a granular graft copolymer from a latex of a graft copolymer obtained by the emulsion graft polymerization of vinyl chlorides onto an ethylene/vinyl ester copolymer.

It is well known that graft copolymers obtained by the graft polymerization of 70–5 parts by weight of vinyl chloride onto 30–95 parts by weight of an ethylene/vinyl ester copolymer are useful as flexible resins containing no plasticizers. Hereinafter, said graft copolymers giving flexible resins are referred to as "the Graft Polymer" simply.

The most convenient method for preparing the Graft Polymer is the method in which vinyl chloride is added to a latex of an ethylene/vinyl ester copolymer and the emulsion graft polymerization is effected. The suspension graft polymerization method requires a step of dissolving an ethylene/vinyl ester copolymer into vinyl chloride, whereas the emulsion graft polymerization method does not require such a troublesome dissolving step.

However, in the conventional processes for preparing a granular graft copolymer from a latex of the Graft Polymer produced by the emulsion graft polymerization, there have been found the following significant disadvantages on the process and on the quality; the polymer obtained by salting-out is difficult to be dehydrated, water content after dehydration being very high; also the polymer is difficult to be dried in a commercially convenient flush dryer or fluidized-bed dryer, drying rate being low and drying marks being apt to occur; the apparent specific gravity of the polymer dried is so small that it is difficult to supply said polymer to a processing machine smoothly; and moreover, a strong odor of fatty acid occurs after leaving said polymers for a long period of time as dry particles or shaped articles therefrom, which spoils the commodity value to a large extent.

The more the content of ethylene/vinyl ester copolymer in the Graft Polymer, the more remarkable the above disadvantages. The odor of fatty acid is especially noticeable when a lower vinyl ester such as vinyl acetate or vinyl propionate is used.

It should be noted that graft copolymers having a vinyl chloride content more than 70%, which give rigid resins, have not the above disadvantages.

An object of this invention is to provide a process for preparing a granular graft copolymer from a latex of the Graft Polymer produced by the emulsion graft polymerization, in which dehydration and drying can be conducted very conveniently.

Another object of this invention is to provide the Graft Polymer granules having a large apparent specific gravity and not causing the odor of fatty acid after a long preservation as dry particles or a long use as shaped articles therefrom.

This invention provides a process for preparing a granular graft copolymer from a latex of graft copolymer produced by the emulsion graft polymerization of 70–5 parts by weight of vinyl chloride onto 30–95 parts by weight of an ethylene/vinyl ester copolymer, said process comprising the steps of salting-out, dehydrating and drying, wherein the improvement comprises heating the graft copolymer in a step or stage prior to the dehydrating step at a temperature between 60° C. and 110° C. under the condition that the value (heating time)$^{1/2}$ × (heating temperature −30)$^2$ (min.$^{1/2}$. ° C.$^2$) falls within the range of 2,000 to 20,000, and dehydrating the graft copolymer at a temperature lower than 60° C. but higher than 0° C.

Furthermore, this invention provides the improvement which comprises further adding a metal salt of higher fatty acid, said metal being selected from the group consisting of Mg, Ca, Zn, Sr, Cd, Ba and Pb, in a step or stage prior to the drying step.

An ethylene/vinyl acetate copolymer is most preferably used as an ethylene/vinyl ester copolymer, preferably a vinyl acetate content thereof being about 40% to 60%. Vinyl acetate may be replaced in part or in whole by vinyl propionate, vinyl butyrate, vinyl stearate and the like. An ethylene/vinyl ester copolymer containing a small proportion of monomers other than ethylene and vinyl ester may be used.

In the emulsion graft polymerization of vinyl chloride onto an ethylene/vinyl ester copolymer, the ethylene/vinyl ester copolymer is preferably used in a form of a latex, which is generally obtained by the emulsion copolymerization of ethylene and a vinyl ester in an aqueous medium in the presence of an emulsifying agent and a free radical initiator. The emulsifying agent used in said emulsion copolymerization may be anionic, cationic or nonionic. Nonionic and anionic emulsifiers are preferred.

In the emulsion graft polymerization of vinyl chloride onto an ethylene/vinyl ester copolymer being in a latex, the polymerization initiator and the polymerization temperature may be selected at one's discretion. The polymerization initiators usually used are free radical polymerization initiators such as cumene hydroperoxide, tertially butyl hydroperoxide, ammonium persulfate, potassium persulfate, hydrogen peroxide, azobisisobutyronitrile, tertially butyl peroxy-pivalate, diisopropyl peroxy-dicarbonate, laurylperoxide and the like. Redox polymerization initiators may be used if desired. The polymerization temperature generally is in the range between 0° C. and 70° C.

In the graft polymerization, the emulsifying agent may be omitted but is preferably added in order to obtain graft copolymers containing a higher vinyl chloride content.

The Graft Polymer is produced by the graft polymerization of 70–5 parts by weight of vinyl chloride onto 30–95 parts by weight of an ethylene/vinyl ester copolymer (parts herein include not only those of vinyl chloride completely graft polymerized but also those homo-polymerized). The use of graft copolymers having lower ethylene/vinyl ester copolymer contents which give rigid resins, is included from the scope of this invention, since they are inherently ready to be well dehydrated and dried and cause no odor of fatty acid.

In the process of this invention, vinyl chloride may be replaced by a monomer mixture of at least 70% by weight of vinyl chloride and at most 30% by weight of other copolymerizable compound.

Solid graft copolymers are prepared from latex of the Graft Polymer through the steps of salting-out—dehydrating-drying. The steps may be conducted batchwise but preferably in a continuous manner for the commercial production.

In the salting-out step, a latex of the Graft Polymer and a salting agent are stirred together to effect salting-out and to obtain a solid copolymer. In order to obtain the solid copolymer in a granular form, selections of polymer concentration, stirring condition and salting-out temperature are important because they influence on the particle size and the distribution thereof. The above conditions are preferably varied depending on the vinyl chloride content in the Graft Polymer. The salting agent may be suitably selected from organic or inorganic salts, acids, bases or other water-soluble organic compounds. Generally inorganic salts are favourably used.

This invention is characterized by that the Graft Polymer is treated by heating in a step or stage prior to the dehydrating step under the specific conditions and further dehydrated at a specified dehydration temperature.

The heat treatment may be conducted in any step or stage prior to the dehydrating step, preferably simultaneously in the salting-out step. It is also preferable that the solid copolymer obtained after the salting-out step is washed with hot water to effect the heat treatment and the water rinsing at the same time. It is desirable that the heat treatment is conducted in an aqueous dispersion medium in which particles of the Graft Polymer are dispersed. The heat treatment is conducted at a temperature between 60° C. and 110° C. and under the condition that the value (heating time)$^{1/2}$ × (heating temperature −30)$^2$ (min. $^{1/2}$ °. C.$^2$) (hereinafter referred to as H-value) falls in the range of 2,000 to 20,000. The heating condition varies depending on the vinyl chloride content in the Graft Polymer and the vinyl ester content in the ethylene/vinyl ester copolymer. Generally the preferable heating time ranges between 0.5 to 10 minutes at 100° C. and between 10 to 240 minutes at 60° C. It is preferable that graft copolymer particles in an aqueous dispersion are heat treated under agitation.

If the heat treatment is not conducted or if the H-value is less than 2,000, the following disadvantages are found; the water content after the dehydrating step is remarkably high, particles tending to adhere together and the commercially convenient continuous dehydration with a continuous centrifugal dehydration filter or with a super decanter being very difficult, and when the continuous dehydration is employed the particles form lumps in part; also in the drying step the tendency of adhesion between particles is noticeable, the commercially convenient drying with a flush dryer or with a fluidized-bed dryer being very difficult, the drying rate being low and the drying marks appearing; further the dried polymer thus obtained has such a small apparent specific gravity that the polymer is difficult to be supplied to a processing machine.

If the H-value exceeds 20,000, the dry particles obtained or the shaped articles therefrom causes a strong odor of fatty acid after being left for a long period of time, which spoils the commodity value to a large extent.

The dehydration is required to be conducted at a temperature lower than 60° C. If the dehydration temperature is 60° C. or higher the tendency of adhesion between particles is remarkable, the commercially convenient drying with a flush drier or with a fluidized-bed drier being almost impossible. If the tray and compartment drying, which is commercially inconvenient, is employed, only particles having poor quality and low commodity value are obtained. The lower limit of the dehydration temperature i.e. 0° C. is the freezing point of water.

The granular graft copolymer obtained according to the abovementioned process is very easy to be handled in the dehydrating and drying steps, water content after the dehydration step being small, a commercially convenient flush drying or fluidized-bed drying being readily applied at a very high drying rate. Moreover, the granular dry graft copolymer obtained is an improved resin having a large apparent specific gravity, being ready in handling and not causing an odor of fatty acid during a long preservation as dry particles or a long use as shaped articles.

The above advantages of this invention are promoted or further improved by adding a metal salt of higher fatty acid, said metal being selected from the group consisting of Mg, Ca, Zn, Sr, Cd, Ba and Pb, in a step of stage prior to the drying step. The metal salt of higher fatty acid include, for example, magnesium, calcium, strontium, barium, zinc, cadmium and lead salts of fatty acids, preferably those having not less than 8 carbon atoms, such as laurate, stearate and octenate. Their derivatives may be also used. Preferred examples are magnesium stearate, calcium laurate, calcium licinoleat, strontium stearate, barium stearate, barium licinoleate, zinc stearate, zinc laurate, cadimum stearate, cadmium licinoleate, lead stearate, basic zinc stearate, dibasic zinc stearate and the like.

The amount of the metal salt to be added to the Graft Polymer may be adjusted depending on the various conditions. Generally, the preferred proportions are about 0.1–20 parts by weight, especially 0.5–5 parts by weight, of the metal salt per 100 parts by weight of the Graft Polymer.

It is advisable that the metal salt has the primary particle size (diameter less than 50 microns. Some particles having the diameter over 50 microns may coexist with those having the diameter less than 50 microns, but the use of those larger particles is very poor.

The metal salt may be added to the Graft Polymer after being adjusted into a form having the primary particles less than 50 microns or alternatively may be added in other forms and then changed into the above form in an aqueous medium containing the Graft Polymer. An example of the former is a way of wetting calcium stearate having particle size less than 50 microns with methanol and then adding it into a slurry of the Graft Polymer before the dehydrating step or to the Graft Polymer after the dehydrating step. An example of the latter in a way of adding a solution of sodium stearate into a slurry of the Graft Polymer containing calcium chloride added as a salting agent and thereby precipitating particles of calcium stearate.

Though the metal salt may be added in a dry form i.e. a simple powdery form, especially after the dehydrating step, it is preferable to add the metal salt in a wet form or in a slurry, for example, in a form wet with a water-soluble organic solvent such as methanol, or in a form given affinity for water with a surface active agent, in order to admix the metal salt and the Graft Polymer as uniformly as possible.

The metal salt may be added to the Graft Polymer in any step or stage prior to the drying step, including the heating step. In any case, the addition of the metal salt effects improvements in the drying of the Graft Polymer and in the restraint of the odor of fatty acid.

But it is preferable to add the metal salt before the dehydrating step, because as additional effect is found that the dehydration on a commercially large scale of the Graft Polymer can be more readily conducted, the commercial continuous centrifugal dehydration being applicable at a high dehydration rate, and the Graft Polymer well dehydrated can be very smoothly discharged from a continuous centrifugal filter or from a continuous centrifugal separator. The metal salt added before the dehydration is well retained on the granules of the Graft Polymer still after the dehydration, only a small proportion of the metal salt escaping with water, which has been unexpected.

Of course, the metal salt may be added after the dehydrating step but before the drying step. In this case, the above additional effect of the metal salt upon dehydration can not be obtained, but the drying of the Graft Polymer and the restraint of the fatty acid odor are much improved.

The Graft Polymer, to which the metal salt has been added, can be dried very conveniently in various dryers. Dryers such as flush dryer, fluidized-bed dryer and the like, and dryers such as screw dryer, rotary dryer, vertical turbodryer and the like can be employed. According to this invention, the drying rate in such dryers is much higher than in the conventional processes.

Percentages and parts in the following examples are by weight unless otherwise stated.

EXAMPLE 1

A latex of a graft copolymer consisting of 40.5 parts of vinyl chloride and 59.5 parts of an ethylene/vinyl acetate copolymer was obtained by the emulsion graft polymerization of vinyl chloride onto an ethylene/vinyl acetate copolymer (ethylene content 50.5%), the copolymer being in an emulsion.

A granular graft copolymer was obtained from said latex through the steps of salting-out-water-rinsing-dehydrating-drying in a continuous manner. In the salting-out step, the latex and an aqueous solution of calcium chloride were continuously added while stirring at a salting-out temperature of 25° C. Particles having an average particle size of 0.92 mm. were obtained, which were then heated for 16 minutes at a temperature of 90° C. (H-value 14400). The particles were cooled down by washing with water and then continuously dehydrated with a super decanter at a slurry temperature of 20° C.

In the drying step, said particles were dried in a two-stage dryer consisting of a flush dryer (entrance temperature of hot air 108° C.) and a rotary dryer (entrance temperature of hot air 60° C.). The dry particles thus obtained were in the form of white granules, having the average particle size of 0.61 mm. with a narrow distribution of particle size. Said particles were extremely easy to be handled in the dehydrating and drying steps. The results of this example are shown in Table 1 compared with those of Reference Examples.

Reference Example 1

For comparison, the procedure of Example 1 was repeated except that the heating step is omitted. In the dehydrating step, a continuous dehydration was not possible to be conducted because the polymers clogged the super decanter. Also in the drying step, handling was very difficult because the particles became lumps in part, which caused troubles frequently.

The final particles were obtained as undryed ones having the average particle size of 0.85 mm. with a wide distribution of particle size and including lumps in part.

Reference Example 2

The procedure of Example 1 was repeated except that the heating step was conducted at a temperature of 90° C. for 50 min. (H-value 25456). Handling in the dehydrating and drying steps were as easy as that in Example 1. The dry particles obtained were a little colored and caused strong odor of acetic acid after leaving it for two months in summer.

Reference Example 3

The procedure of Example 1 was repeated except that the temperature in the dehydrating step was adjusted at 65° C. Continuous dehydration with a super decanter was not possible to be conducted. Dehydrated particles were obtained as lumps having a high water content. A part of large lumps could not be flush-dried and those particles which could be barely flush-notary-dried were obtained as undry lumps.

TABLE 1

| | Average particle size after salting-out (mm.) | Water content after dehydration [1] (percent) | Continuous dehydration | Continuous flush drying | Water content after drying [1] (percent) | Average particle size after drying | Lumps larger than 6 mesh (percent) | Coloring after drying | Odor of acetic acid [2] |
|---|---|---|---|---|---|---|---|---|---|
| Example 1 | 0.92 | 67 | Easy | Easy | 0.5 | 0.61 | 0.5 | Noncolored | None. |
| Reference Example: | | | | | | | | | |
| 1 | 0.92 | 82 | Impossible | Impossible | 6.4 | 0.85 | 34.6 | do | Slight. |
| 2 | 0.92 | 66 | Easy | Easy | 0.8 | 0.63 | 1.2 | Colored | Strong. |
| 3 | 0.92 | 75 | Impossible | Impossible | 7.1 | 0.94 | 40.5 | Non-colored | Slight. |

[1] A water content based on dry resin.
[2] Odor of acetic acid after leaving for two months in summer.

As shown in Table 1, compared to the particles obtained in Reference Examples 1, 2 and 3, the particles obtained in Example 1 are much excellent in water content after dehydration, state after dehydration, drying rate and state after drying. They can be well dried with commercially convenient dryers. Further they are superior in quality; no coloring after drying and no odor of acetic acid.

EXAMPLE 2

A latex of graft copolymer consisting of 33.5 parts of vinyl chloride and 66.5 parts of an ethylene/vinyl acetate copolymer was obtained by the emulsion graft polymerization of vinyl chloride onto an ethylene/vinyl acetate copolymer (ethylene content 42.2%), the copolymer being in an emulsion.

A granular graft copolymer was obtained from said latex through the steps of salting-out-water-rinsing-dehydrating-drying. In the salting-out step, the latex and an aqueous solution of sodium chloride were continously added at a salting-out temperature of 20° C. and then heated for 40 min. by adding hot water and heating with steam in jacket to a temperature of 70° C. (H-value 10120). The particles obtained were cooled while washing with water and continuously dehydrated with a super decanter at a slurry temperature of 30° C. In the drying step, the particles were dried in a two-stage dryer consisting of a flush dryer (entrance temperature of hot water 102° C.) and a rotary dryer (entrance temperature of hot water 62° C.) The results of this example are shown in Table 2 together wth those of Examples 3 and 4.

EXAMPLE 3

The procedure of Example 2 was repeated except that in the water-rinsing step, was added a slurry in which one part of calcium stearate (average particle size 1 micron) per 100 parts of the graft copolymer is dispersed in methanol-water.

EXAMPLE 4

The procedure of Example 2 was repeated except that after the dehydrating step but prior to the drying step, once part of calcium stearate (average particle size 1 micron) was added per 100 parts of the graft copolymer, said calcium stearate having been mixed beforehand with the dried graft copolymer obtained in Example 2 in equal weight ratio.

TABLE 2

| Example: | Water content after dehydration (percent) | Water content after drying (percent) | Apparent specific gravity after drying | Odor of acetic acid after leaving for— | | |
|---|---|---|---|---|---|---|
| | | | | 3 mo. | 4 mo. | 5 mo. |
| 2 | 70 | 0.9 | 0.375 | Slight | Weak | Strong. |
| 3 | 58 | 0.1 | 0.426 | None | None | None. |
| 4 | 70 | 0.2 | 0.441 | do | do | Do. |

Dehydration and drying in Example 2 were easy to be conducted. Dehydration and drying in Example 3 and drying in Example 4 were more easy. Thus the effects of this invention are promoted by adding calcium stearate, a metal salt of a higher fatty acid. The effects of Examples 3 and 4 are better compared to that of Example 2; the drying rate being higher, the apparent specific gravity being larger and the odor of acetic acid not occurring after leaving the particles for five months.

EXAMPLE 4

A latex of a graft copolymer consisting of 46.9 parts of vinyl chloride, 4.8 parts of methyl methacrylate and 48.3 parts of an ethylene/vinyl acetate copolymer was obtained by the emulsion graft polymerization of vinyl chloride and methyl methacrylate onto an ethylene/vinyl acetate copolymer (ethylene content 55.4%), the copolymer being in an emulsion.

A granular graft copolymer was obtained from said latex through the batchwise steps of salting-out-water-rinsing-dehydrating-drying. In the salting-out step, an aqueous solution of calcium chloride was gradually added to the latex while stirring at a salting-out temperature of 70° C., and at the same time heat treatment was conducted for 30 min. (H-value 8763). A granular graft copolymer was obtained. Said granular graft copolymer was then cooled and dehydrated batchwise at a slurry temperature of 40° C. with a centrifugal separator. The water content of the particles obtained after the dehydrating step was 72% (based on dry resin). The dehydrating step was easy to be conducted without producing lumps. The particles were dried in a fluidized-bed dryer (temperature of hot air 80° C.). Drying was easily conducted though it required 62 min.

EXAMPLE 6

The procedure of Example 5 was repeated except that a semi-emulsion of 0.5 part of barium stearate per 100 parts of graft copolymer was added to the slurry before dehydration and then dehydration was conducted. The water content of the particles obtained after dehydration was improved to 65%; drying time required for the fluidized-bed drying was 44 min.; and handling in the dehydrating and drying steps was very easy.

EXAMPLE 7

A latex of a graft copolymer consisting of 56 parts of vinyl chloride and 44 parts of an ethylene/vinyl acetate/vinyl stearate copolymer was obtained by the emulsion graft copolymerization of vinyl chloride onto a copolymer being in a latex, the copolymer consisting of 55%, 40% and 5% of ethylene/vinyl acetate/vinyl stearate respectively. Said graft copolymer was subjected to the batchwise steps of salting-out-water-rinsing-dehydrating-drying. In the salting-out step, an aqueous solution of sodium sulfate was gradually added to the latex of the graft copolymer at room temperature under stirring. After water rinsing, the graft copolymer was heated for three min. by placing the 20% slurry of the graft copolymer in a large proportion of hot water (100° C.) (H-value 8487) and then cooled down rapidly and dehydrated at room temperature with a centrifugal separator. The water content of the particles obtained after dehydration was 50.5% (based on dry resin), which was lowered to 0.8% by using a vacuum rotary dryer for ten hours under a reduced pressure of 320 mm. Hg.

Reference Example 4

For comparison, the procedure of Example 7 was repeated except that after water rinsing a temperature of 50° C. was maintained for 20 minutes. (H-value 1789) by placing the slurry of the graft copolymer in a large proportion of warm water (50° C.) in place of the hot water (100° C.). The water content of the particles obtained after dehydration was 59.1% (based on dry resin), which was lowered to 0.9% by using the vacuum rotary dryer for 16 hours under a reduced pressure of 320 mm. Hg. The effect of the heat treatment in Example 7 is evident.

EXAMPLE 8

The procedure of Example 7 was repeated except that after the dehydrating step but before the drying step, calcium stearate in a powdery form were added and mixed with the dehydrated graft copolymer in a ratio of 7 parts of calcium stearate per 100 parts of dry graft copolymer. The water content of the particles became 0.9% after the vacuum rotary drying for 8 hours. It is evident that the addition of a metal salt of a higher fatty acid before drying accelerates the drying rate.

What is claimed is:

1. In a process for preparing a granular graft copolymer from a latex of graft copolymer produced by the emulsion graft polymerization of 70–5 parts by weight of vinyl chloride onto 30–95 parts by weight of an ethylene/vinyl ester of a carboxylic acid copolymer, said process comprising the steps of salting-out, dehydrating and drying, the improvement which comprises heating the graft copolymer in a step or stage prior to the dehydrating step at a temperature between 60° C. and 110° C. under the condition that the value (heating time in minutes) $^{1/2} \times$ (heating temperature $-30°$ C.)$^2$ falls within the range of 2,000 to 20,000 and dehydrating the graft copolymer at a temperature lower than 60° C. but higher than 0° C.

2. A process according to claim 1, wherein a metal salt of a higher fatty acid containing not less than 8 carbon atoms, said metal being selected from the group consisting of Mg, Ca, Zn, Sr, Cd, Ba and Pd, is added to the graft copolymer in a step or stage prior to the drying step.

3. A process according to claim 1 wherein the vinyl chloride is replaced by a monomer mixture of at least 70% by weight of vinyl chloride and at most 30% by weight of other copolymerizable compound.

4. A process according to claim 1, wherein the heating is conducted simultaneously in the salting-out step.

5. A process according to claim 1, wherein the heating is conducted after the salting-out step but before the dehydrating step.

6. A process according to claim 2, wherein the amount of the metal salt to be added is 0.1–20 parts by weight per 100 parts by weight of the graft copolymer.

7. A process according to claim 2, wherein the metal salt has the primary particle size less than 50 microns.

8. A process according to claim 2, wherein the metal salt is added before the dehydrating step.

9. A process according to claim 2, wherein the metal salt is added after the dehydrating step but before the drying step.

References Cited

UNITED STATES PATENTS 3,322,858   5/1967   Coaker et al. _____ 260—878

FOREIGN PATENTS 726,234   1/1966   Canada _____ 260—878

DONALD E. CZAJA, Primary Examiner

D. J. BARRACK, Assistant Examiner

U.S. Cl. X.R.

260—23 H, 23 EM, 29.6 PT, 29.6 T, 96 R, 878 R